(12) United States Patent
Zhang et al.

(10) Patent No.: US 12,532,332 B2
(45) Date of Patent: Jan. 20, 2026

(54) COMMUNICATION METHOD AND APPARATUS, AND DEVICE

(71) Applicant: GUANGDONG OPPO MOBILE TELECOMMUNICATIONS CORP., LTD., Guangdong (CN)

(72) Inventors: Shichang Zhang, Guangdong (CN); Huei-ming Lin, South Yarra (AU); Zhenshan Zhao, Guangdong (CN); Yi Ding, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/749,508

(22) Filed: Jun. 20, 2024

(65) Prior Publication Data

US 2024/0340926 A1 Oct. 10, 2024

Related U.S. Application Data

(63) Continuation of application No. 18/183,043, filed on Mar. 13, 2023, now Pat. No. 12,101,790, which is a
(Continued)

(30) Foreign Application Priority Data

Sep. 25, 2020 (WO) ................ PCT/CN2020/117868

(51) Int. Cl.
*H04W 72/25* (2023.01)
*H04W 72/02* (2009.01)
(Continued)

(52) U.S. Cl.
CPC .......... *H04W 72/25* (2023.01); *H04W 72/02* (2013.01); *H04W 72/541* (2023.01); *H04W 72/566* (2023.01)

(58) Field of Classification Search
CPC . H04W 72/25; H04W 72/541; H04W 72/566; H04W 72/02
See application file for complete search history.

(56) References Cited

U.S. PATENT DOCUMENTS

| 10,440,520 B2 | 10/2019 | Sheng |
| 2017/0332207 A1 | 11/2017 | Sheng |
| | (Continued) | |

FOREIGN PATENT DOCUMENTS

| CN | 102238718 A | 11/2011 |
| CN | 104462593 A | 3/2015 |
| | (Continued) | |

OTHER PUBLICATIONS

The EESR of corresponding European application No. 21870703.2, dated Jan. 15, 2024.
(Continued)

*Primary Examiner* — Rhonda L Murphy
(74) *Attorney, Agent, or Firm* — Ladas & Parry LLP

(57) ABSTRACT

A communication method, terminal device and storage medium are provided. The method includes: determining, by a first terminal device, a first time period; and transmitting, by the first terminal device, a first resource set to a second terminal device within the first time period, wherein the first resource set is used for the second terminal device to perform resource selection.

9 Claims, 9 Drawing Sheets

Related U.S. Application Data continuation of application No. PCT/CN2021/078178, filed on Feb. 26, 2021.

(51) Int. Cl.
*H04W 72/541* (2023.01)
*H04W 72/566* (2023.01)

(56) References Cited

U.S. PATENT DOCUMENTS

| | | |
|---|---|---|
| 2020/0163005 A1 | 5/2020 | Rao |
| 2020/0178256 A1 | 6/2020 | Tang |
| 2020/0404560 A1 | 12/2020 | Zhang |
| 2021/0045088 A1 | 2/2021 | Cai |
| 2021/0068125 A1 | 3/2021 | Lin |
| 2021/0227464 A1 | 7/2021 | Kung |
| 2022/0394744 A1 | 12/2022 | Lee |
| 2023/0050238 A1 | 2/2023 | Ganesan |
| 2023/0156669 A1 | 5/2023 | Zhou |
| 2023/0269039 A1 | 8/2023 | Gao |
| 2024/0314816 A1* | 9/2024 | Liu .................. H04W 28/02 |

FOREIGN PATENT DOCUMENTS

| | | |
|---|---|---|
| CN | 109391924 A | 2/2019 |
| CN | 109587260 A | 4/2019 |
| CN | 110167072 A | 8/2019 |
| CN | 110225585 A | 9/2019 |
| CN | 110741710 A | 1/2020 |
| CN | 111148223 A | 5/2020 |
| CN | 111246483 A | 6/2020 |
| CN | 111615192 A | 9/2020 |
| WO | 2017197122 A1 | 11/2017 |
| WO | 2020011229 A1 | 1/2020 |
| WO | 2020015345 A1 | 1/2020 |

OTHER PUBLICATIONS

The first Office Action of corresponding Indian application No. 202317027405, dated Apr. 3, 2024.
Fraunhofer HHI, Fraunhofer IIS, "Resource Allocation Enhancements for Mode 2", 3GPP TSG RAN WG1 Meeting #102-e, R1-2005537, e-Meeting, Aug. 17-28, 2020, pp. 1-9.
LG Electronics, "Discussion on resource allocation for power saving", 3GPP TSG RAN WG1 #102-e R1-2005748, e-Meeting, Aug. 17-Aug. 28, 2020, pp. 1-5.
ITRI , "Remaining Issues on Resource Allocation in NR Sidelink Mode 2", 3GPP TSG RAN WG1 #101-e R1-2003653, e-Meeting, May 25-Jun. 5, 2020, pp. 1-5.
Intel Corporation, "QoS Aware Congestion Control for NR V2X Communication", 3GPP TSG RAN WG1 Meeting #98bis R1-1910654, Chongqing, China, Oct. 14-20, 2019, pp. 1-12.
First Office Action of the Japanese application No. 2023-517879, issued on Nov. 26, 2024, 7 pages with English translation.
First Office Action of the Chinese application No. 202310367229.8, issued on Jul. 6, 2024, 16 pages with English translation.
Second Office Action of the Chinese application No. 202310367229.8, issued on Sep. 12, 2024, 15 pages with English translation.
Qualcomm Incorporated. "Reliability and Latency Enhancements for Mode 2",3GPP TSG RAN WG1 Meeting #102-e. R1-2006829, Aug. 17-28, 2020.
Huawei, HiSilicon. "Inter-UE coordination in sidelink resource allocation", 3GPP TSG RAN WG1 Meeting #102-e, R1-2005255, E-meeting, Aug. 17-28, 2020.
Nokia, Nokia Shanghai Bell. "Discussion of sidelink resource allocation mode 2 enhancements", 3GPP TSG RAN WG1#102-e, R1-2005501, e-Meeting, Aug. 17-28, 2020.
CATT. "Discussion on feasibility and benefits for mode 2 enhancements", 3GPP TSG RAN WG1 meeting #102 R1-2005692, e-Meeting, Aug. 17-28, 2020.
LG Electronics. "Discussion on feasibility and benefits for mode 2 enhancement", 3GPP TSG RAN WG1 Meeting #102-e, R1-2005749,e-Meeting, Aug. 17-28, 2020.
Intel Corporation. "On Feasibility and Benefts of Sidelink Enhancements Targeting Mode 2 Reliability and Latency". 3GPP TSG RAN WG1 Meeting #102-E, R1-2005897,e-Meeting, Aug. 17-28, 2020.
ZTE, Sanechips. "Inter-UE coordination in mode-2", 3GPP TSG RAN WG1 #102-e, R1-2005961,e-Meeting, Aug. 17-28, 2020.
Vivo. "Discussion on mode 2 enhancements", 3GPP TSG RAN WG1 #102-e, R1-2005404, e-Meeting, Aug. 17-28, 2020.
Samsung. "On Feasibility and Benefits for Mode2 Enhancements", 3GPP TSG RAN WG1 #102-e, R1-2006171, e-Meeting, Aug. 17-28, 2020.
Erlesson. "Feasibility and benefits of mode 2 enhancements for inter-UE coordination", 3GPP TSG-RAN WG1 Meeting #102-e, R1-2006445,e-Meeting, Aug. 17-28, 2020.
NTT DOCOMO, Inc. Discussion on sidelink resource allocation for reliabillity and latency enhancements, 3GPP TSG RAN WG1 #102. R1-2006748,e-Meeting, Aug. 17-28, 2020.
International Search Report(ISR) dated Jun. 23, 2021 for Application No. PCT/CN2020/117868.
Written Opinion(WOSA) dated Jun. 23, 2021 for Application No. PCT/CN2020/117868.
OPPO. "Discussion on remaining open issues in mode 2",3GPP TSG-RAN WG1 Meeting #101-e, R1-2004074, e-Meeting, May 25-Jun. 5, 2020.
MediaTek Inc.. "On sidelink mode_2 resource allocation",3GPP TSG RAN WG1Meeting#99, R1-1912106, Reno, USA, Nov. 18-22, 2019.
International Search Report(ISR) dated Jun. 16, 2021 for Application No. PCT/CN2021/078178.
Written Opinion(WOSA) dated Jun. 16.2021 for Application No. PCTICN2021/078178.

* cited by examiner

COMMUNICATION METHOD AND APPARATUS, AND DEVICE

CROSS-REFERENCE TO RELATED APPLICATIONS

This application is a continuation of U.S. patent application Ser. No. 18/183,043, filed on Mar. 13, 2023, which is a continuation of International Patent Application No. PCT/CN2021/078178, filed on Feb. 26, 2021. The International Patent Application No. PCT/CN2021/078178 claims priority to International Patent Application No. PCT/CN2020/117868, filed on Sep. 25, 2020. All of the aforementioned applications are incorporated herein by reference in their entireties.

TECHNICAL FIELD

The present disclosure is related to the field of communication technologies and, specifically, to a communication method, terminal device and storage medium.

BACKGROUND

In device to device (D2D) communication, two devices in communication are both terminal devices.

In a process of communication between terminal devices, a terminal device can select a resource from a resource pool and perform data transmission based on the selected resource. However, resources in resource pools of multiple terminal devices may be overlapping, resulting in that a resource selected by one terminal device may be the same as a resource selected by another terminal device, resulting in a resource conflict, thereby, incurring relatively high communication interference.

SUMMARY

Embodiments of the present disclosure provide a communication method, terminal device and storage medium.

In a first aspect, an embodiment of the present disclosure provides a communication method, including: determining, by a first terminal device, a first time period; and transmitting, by the first terminal device, a first resource set to a second terminal device within the first time period, where the first resource set is used for the second terminal device to perform resource selection.

In a second aspect, an embodiment of the present disclosure provides a terminal device, comprising a transceiver, a processor and a memory; wherein the memory has computer-executable instructions stored therein, and the processor executes the computer-executable instructions stored in the memory, to enable the processor to implement the steps of: determining a first time period; and transmitting a first resource set to a second terminal device within the first time period, wherein the first resource set is used for the second terminal device to perform resource selection.

In a third aspect, an embodiment of the present disclosure provides a non-transitory computer-readable storage medium, storing thereon computer-executable instructions, when being executed by a processor, implement the steps of: determining a first time period; and transmitting a first resource set to a terminal device within the first time period, wherein the first resource set is used for the terminal device to perform resource selection.

DETAILED DESCRIPTION

Figure 1A:
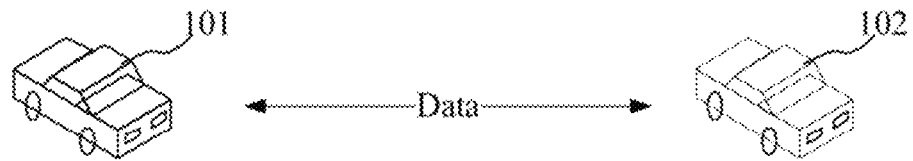
FIG. 1A is a schematic diagram of unicast transmission according to an embodiment of the present disclosure.

Firstly, to facilitate understanding, the concepts related to the present disclosure are explained.

Terminal device: it is a kind of device with a wireless transceiving function. The terminal device can be deployed on land, including an indoor or outdoor, handheld, wearable or vehicle-mounted terminal device; it can also be deployed on the water (e.g., on a ship or the like); it can further be deployed in the air (e.g., on an aircraft, balloon, satellite and the like). The terminal device can be a mobile phone, a pad, a computer with a wireless transceiving function, a virtual reality (VR) terminal device, an augmented reality (AR) terminal device, a wireless terminal in industrial control, a vehicle-mounted terminal device, a wireless terminal in self driving, a wireless terminal device in remote medical, a wireless terminal device in a smart grid, a wireless terminal device in transportation safety, a wireless terminal device in a smart city, a wireless terminal device in a smart home, a wearable terminal device, etc. The terminal device related to embodiments of the present disclosure may also be referred to as a terminal, user equipment (UE), an access terminal device, a vehicle-mounted terminal, an industrial control terminal, a UE unit, a UE station, a mobile station, a mobile platform, a remote station, a remote terminal device, a mobile device, a UE terminal device, a wireless communication device, a UE agent or a UE device, etc. The terminal device may also be stationary or mobile.

Network device: it is a kind of device with a wireless transceiving function, including but not limited to: an evolutional base station (Evolutional NodeB, eNB or eNodeB) in long term evolution (LTE), a base station (gNodeB or gNB) or a transmission receiving point/transmission reception point (TRP) in new radio (NR) technology, a base station in a future evolutional system, an access node, a wireless relay node or a wireless backhaul node in a wireless fidelity (WiFi) system, etc. A base station may be a macro base station, a micro base station, a pico base station, a small station, a relay station, or a balloon station. Multiple base stations may support a network of the same technology mentioned above, or support networks of different technologies mentioned above. The base station may contain one or more co-site or non-co-site TRPs. The Network device can also be a wireless controller, a centralized unit (CU), and/or a distributed unit (DU) in a cloud radio access network (CRAN) scenario. The network device can also be a server, a wearable device, a vehicle-mounted device or the like. Description is made hereunder by taking an example where the network device is a base station. Multiple network devices may be base stations of the same type or different types. The base station can communicate with a terminal, or it can communicate with the terminal through a relay station. The terminal can communicate with multiple base stations of different technologies. For example, the terminal can communicate with a base station supporting an LTE network, and it can also communicate with a base station supporting a 5G network, it can further support a dual connection with a base station of an LTE network and a base station of a 5G network, and it can also support a dual connection with base stations of a 5G network.

Time unit: it refers to a time domain resource. A time unit can include multiple sub time units. For example, the time unit may be a time slot, and the sub time unit may be a symbol. For another example, the time unit may be a subframe, and the sub time unit may be a time slot or a symbol. For the convenience of description, in the following, description is made by taking an example where the time unit is a time slot and the sub time unit is a symbol.

Sidelink communication: it refers to communication between terminal devices. A link between terminal devices is referred to as a sidelink. The sidelink can also be referred to as a device-to-device (D2D) link, side link, side-link, etc., which is not limited in the embodiments of the present disclosure. A sidelink channel can include a physical sidelink control channel (PSCCH), a physical sidelink shared channel (PSSCH), a physical sidelink feedback channel (PSFCH), a physical sidelink broadcast channel (PSBCH), etc.

Sidelink resource: a sidelink resource can include a PSSCH resource and a PSCCH resource. A PSSCH is used to carry data information, namely, a PSSCH resource is used to transmit data information. A PSCCH is used to carry sidelink control information (SCI), namely, a PSCCH resource is used to transmit SCI. Information in the SCI may be SA (scheduling assignment). The SA refers to related information for data scheduling. For example, the SA may be used to indicate resource allocation or a modulation and coding scheme of a PSSCH. The PSSCH resource may also be referred to as a data resource, and the PSCCH resource may also be referred to as an SA resource.

In a process of sidelink communication, transmission modes between terminal devices include unicast transmission, multicast transmission and broadcast transmission. In the following, the three transmission modes will be respectively introduced in conjunction with FIG. 1A-FIG. 1C.

Unicast transmission: there is usually one receiving terminal for unicast transmission. In the following, the unicast transmission will be introduced in conjunction with FIG. 1A.

FIG. 1A is a schematic diagram of unicast transmission according to an embodiment of the present disclosure. With reference to FIG. 1A, a terminal device 101 and a terminal device 102 are contained, and unicast transmission is performed between the terminal device 101 and the terminal device 102. The terminal device 102 may receive data transmitted by the terminal device 101, also, the terminal device 101 may receive data transmitted by the terminal device 102.

Multicast transmission: in multicast transmission, all terminal devices in a communication group can be receiving devices, or a terminal device within a distance less than a preset distance from a transmitting device can be a receiving device. In the following, the multicast transmission will be introduced in conjunction with FIG. 1B.

Figure 1B:
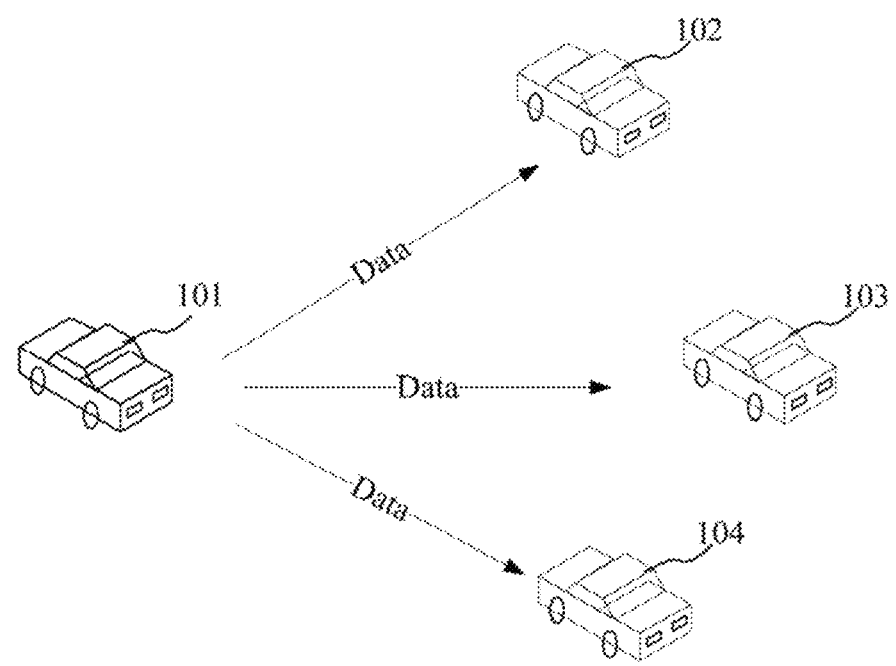
FIG. 1B is a schematic diagram of multicast transmission according to an embodiment of the present disclosure.

FIG. 1B is a schematic diagram of multicast transmission according to an embodiment of the present disclosure. With reference to FIG. 1B, a terminal device 101, a terminal device 102, a terminal device 103 and a terminal device 104 are contained. The four terminal devices may form a communication group, and multicast transmission is performed among the terminal devices in the communication group. The terminal device 102, the terminal device 103 and the terminal device 104 can all receive data transmitted by the terminal device 101.

Broadcast transmission: in broadcast transmission, any terminal device around a transmitting terminal can be a receiving terminal. In the following, the broadcast transmission will be introduced in conjunction with FIG. 1C.

Figure 1C:
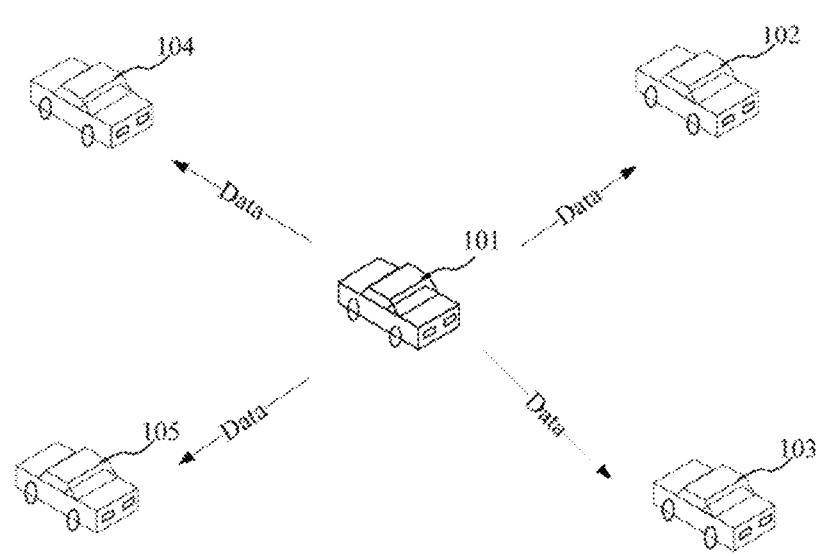
FIG. 1C is a schematic diagram of broadcast transmission according to an embodiment of the present disclosure.

FIG. 1C is a schematic diagram of broadcast transmission according to an embodiment of the present disclosure. With reference to FIG. 1C, a terminal device 101, a terminal device 102, a terminal device 103, a terminal device 104 and a terminal device 105 are contained. The terminal device 102, the terminal device 103, the terminal device 104 and the terminal device 105 are located near the terminal device 101. The terminal device 102, the terminal device 103, the terminal device 104 and the terminal device 105 can receive data broadcasted by the terminal device 101.

2-stage SCI is introduced in NR vehicle to everything (V2X). The first-stage SCI is carried in a PSCCH to indicate information such as a transmission resource, reserved resource information, an MCS level, a priority level or the like of a PSSCH. The second-stage SCI is transmitted in a resource of the PSSCH and demodulated using a demodulation reference signal (DMRS) of the PSSCH to indicate information for data demodulation, such as a transmitting side ID, a receiving side ID, a hybrid automatic repeat request (HARQ) ID, a new data indicator (NDI) or the like. In the following, the two-stage SCI will be introduced through a frame structure of the PSCCH and the PSSCH in conjunction with FIG. 2.

Figure 2:
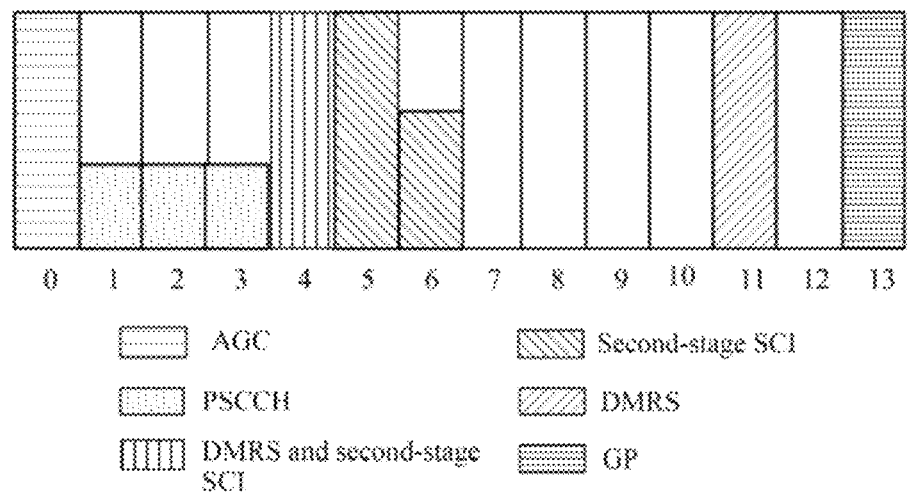
FIG. 2 is a schematic diagram of a frame structure according to an embodiment of the present disclosure.

FIG. 2 is a schematic diagram of a frame structure according to an embodiment of the present disclosure. With reference to FIG. 2, a time length corresponding to a frame structure may be a time slot, and the frame structure includes 14 symbols. Symbol 0 is used to transmit automatic gain control (AGC). Symbol 1, symbol 2 and symbol 3 are used to transmit a PSCCH. Symbol 4 and symbol 11 are used to transmit a DMRS. A second-stage SCI is mapped on symbol 4, symbol 5 and symbol 6, where the second-stage SCI and the DMRS are frequency division multiplexed on symbol 4, and the size of a resource occupied by the second-stage SCI is related to the number of bits of the second-stage SCI. Other symbols are used to transmit a PSSCH.

Under different network coverage conditions, a terminal device may acquire a sidelink resource in different modes. Firstly, to facilitate understanding, three network coverage conditions will be introduced in conjunction with FIG. 3A-FIG. 3C.

Figure 3A:
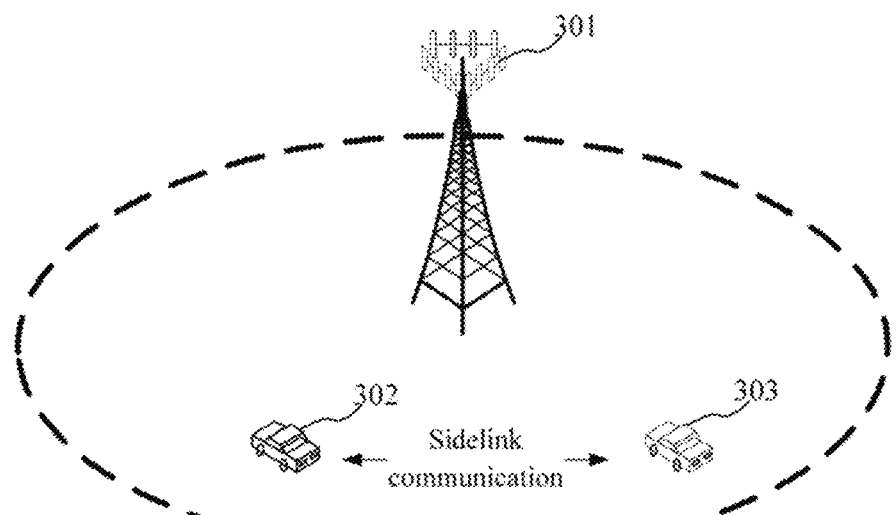
FIG. 3A is a schematic diagram of a network coverage situation according to an embodiment of the present disclosure.

FIG. 3A is a schematic diagram of a network coverage situation according to an embodiment of the present disclosure. With reference to FIG. 3A, a network device 301, a terminal device 302 and a terminal device 303 are contained. The terminal device 302 and the terminal device 303 are both located within the coverage of the same network device 301, and sidelink communication can be performed between the terminal device 302 and the terminal device 303. The terminal device 302 and the terminal device 303 can both receive a configuration instruction from the network device 301 and perform communication based on the configuration instruction.

Figure 3B:
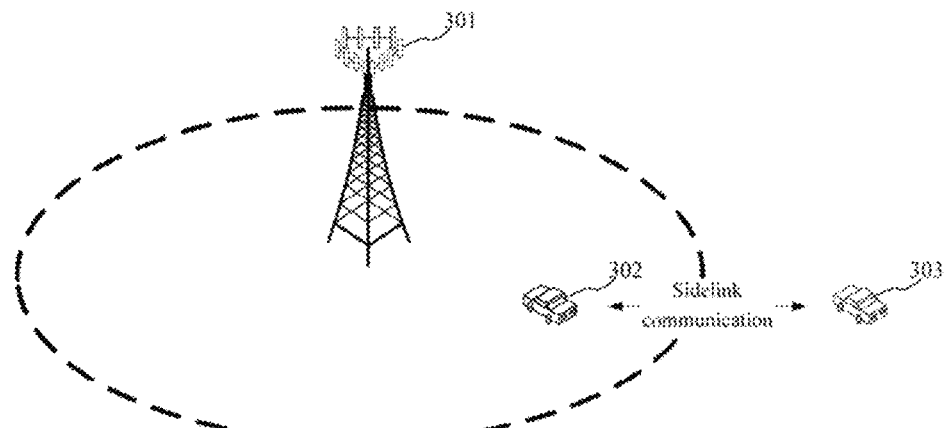
FIG. 3B is another schematic diagram of a network coverage situation according to an embodiment of the present disclosure.

FIG. 3B is another schematic diagram of a network coverage situation according to an embodiment of the present disclosure. With reference to FIG. 3B, a network device 301, a terminal device 302 and a terminal device 303 are contained. The terminal device 302 is located within the coverage of the network device 301, the terminal device 303 is not located within the coverage of the network device 301, and sidelink communication can be performed between the terminal device 302 and the terminal device 303. The terminal device 302 can receive a configuration instruction from the network device 301 and perform communication based on the configuration instruction. The terminal device 303 cannot receive the configuration instruction from the network device 301, instead, the terminal device 303 can determine sidelink configuration according to pre-configuration information and information that is carried in a PSBCH transmitted by a terminal device within the network coverage (for example, the terminal device 302), so as to perform sidelink communication.

Figure 3C:
FIG. 3C is yet another schematic diagram of a network coverage situation according to an embodiment of the present disclosure.

FIG. 3C is yet another schematic diagram of a network coverage situation according to an embodiment of the present disclosure. With reference to FIG. 3C, a terminal device 302 and a terminal device 303 are contained. The terminal device 302 and the terminal device 303 are both located out of the coverage of a network device 301, and sidelink communication can be performed between the terminal device 302 and the terminal device 303. The terminal device 302 and the terminal device 303 can determine sidelink configuration according to pre-configuration information, so as to perform sidelink communication.

Under the foregoing network coverage situations, two resource acquiring modes of a terminal device will be introduced in the following.

First resource acquiring mode: the network device allocates a resource to the terminal device, and the terminal device performs data transmission according to the resource allocated by the network device. The network device may allocate a resource for single transmission to the terminal device, it can also allocate a resource for semi-static transmission to the terminal device. For example, with reference to FIG. 3A, the terminal device 302 and the terminal device 303 can perform data transmission through the resource allocated by the network device 301. For example, with reference to FIG. 3B, the terminal device 302 can perform data transmission through the resource allocated by the network device 301.

Second resource acquiring mode: the terminal device selects a resource from a resource pool for data transmission. The resource pool may be a resource pool allocated by the network device or a preconfigured resource pool. For example, with reference to FIG. 3A, the terminal device 302 and the terminal device 303 may select resources from the resource pool allocated by the network device 301 for data transmission. For example, with reference to FIG. 3B, the terminal device 302 may select a resource from the resource pool allocated by the network device 301 for data transmission, and the terminal device 303 may select a resource from the preconfigured resource pool for data transmission. For example, with reference to FIG. 3C, the terminal device 302 and the terminal device 303 may select resources from the preconfigured resource pool for data transmission.

In the second resource acquiring mode, if the terminal device randomly selects a resource in the resource pool, a probability of a resource conflict is relatively high, or resource utilization is relatively low. The terminal device may also sense a reserved resource of another terminal device (a resource that another terminal device may use in a future time period), and if it is sensed by the terminal device that a certain resource is reserved by another device, the terminal device will not use the resource. However, when selecting a resource according to the sensed result, the resource conflict is still possible, or the resource utilization is relatively low. The terminal device may perform sensing in such a process: the terminal device receives a PSCCH transmitted by another terminal device, where the PSCCH includes a resource reserved by another terminal device, and the terminal device determines, according to the received PSCCH, the resource reserved by another terminal device. The reserved resource is usually a resource to be used by the terminal device to perform data transmission in a future time period.

A problem that exists in a sensing-based resource selection process will be described in the following.

Figure 4A:
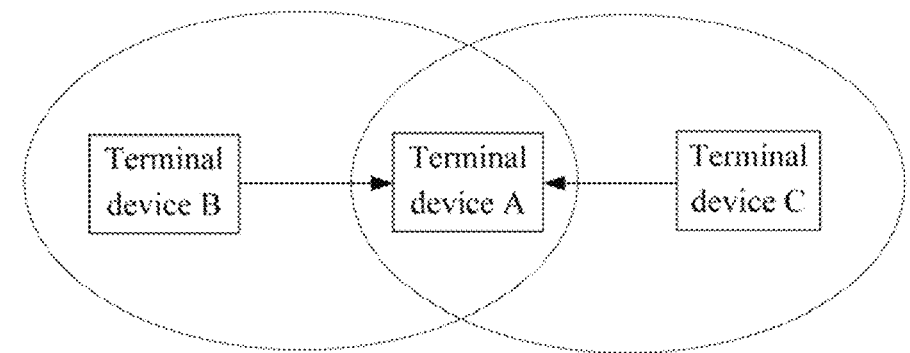
FIG. 4A is a schematic diagram of a data transmission scenario according to an embodiment of the present disclosure.

First case:

the terminal device usually performs sensing within a certain range, and cannot sense a reserved resource of a terminal device that is a relatively long distance away, resulting in that the terminal device may use the same resource with another terminal device that is a relatively long distance away from it, thereby incurring a resource conflict. With reference to FIG. 4A, this case will be described in the following.

FIG. 4A is a schematic diagram of a data transmission scenario according to an embodiment of the present disclosure. With reference to FIG. 4A, a terminal device A, a terminal device B and a terminal device C are contained. The distance between the terminal device B and the terminal device C is relatively long, and the terminal device A is located between the terminal device B and the terminal device C. In a sensing process, due to the relatively long distance between the terminal device B and the terminal device C, neither the terminal device B nor the terminal device C is able to acquire a reserved resource of the counterpart. As a result, the terminal device B and the terminal device C may use a same resource to transmit data (PSSCH) to the terminal device A, thereby, incurring relatively high interference between the terminal device B and the terminal device C.

Second case:
due to limitation of half duplex, while transmitting data, the terminal device cannot receive data from another terminal device. Therefore, the terminal device cannot sense a reserved resource of another terminal device during the transmitting process. To avoid a resource conflict, the terminal device, when selecting a resource, excludes all possible resources that are not sensed. Therefore, the terminal device may exclude too many resources, resulting in that some resources are not fully utilized, thereby, incurring relatively low resource utilization.

Figure 4B:
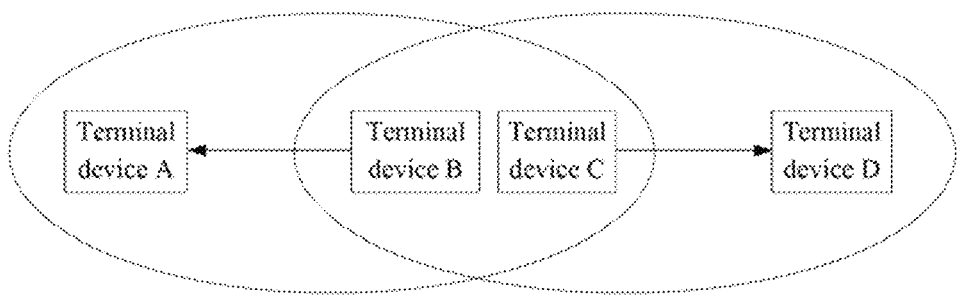
FIG. 4B is a schematic diagram of a data transmission scenario according to an embodiment of the present disclosure.

Third case:
the terminal device, after sensing that another terminal device reserves a certain resource, will not use the resource. However, if two terminal devices use the same resource to transmit data respectively to two terminal devices which are long distance away from each other, there will be no major interference. In this case, if the terminal device does not use the reserved resource of another terminal device, relatively low resource utilization may be caused. With reference to FIG. 4B, this case will be described in the following.

FIG. 4B is a schematic diagram of a data transmission scenario according to an embodiment of the present disclosure. With reference to FIG. 4B, a terminal device A, a terminal device B, a terminal device C and a terminal device D are contained. The distance between the terminal device B and the terminal device C is relatively short, and the distance between the terminal device A and the terminal device D is relatively long. In this case, even though the resource used by the terminal device B to transmit data to the terminal device A is the same one as the resource used by the terminal device C to transmit data to the terminal device D, the success rate of data reception for the terminal device A and the terminal device D will not be affected. However, either the terminal device B or the terminal device C is able to sense a reserved resource of the counterpart, if it is sensed by the terminal device B that the terminal device C has reserved a resource, the terminal device B will not use the resource to transmit data to the terminal device A. However, if the resource is reserved by the terminal device C to transmit data to the terminal device D, relatively low resource utilization will be caused.

To solve the foregoing problem, in an embodiment of the present disclosure, a first terminal device can transmit a first resource set to a second terminal device within an appropriate time period, such that the second terminal device can obtain the first resource set in time, and make reference to the first resource set when performing resource selection, thereby reducing the probability of a resource conflict between the second terminal device and another terminal device, and improving resource utilization.

The method provided in the embodiments of the present disclosure will be described hereunder in detail through specific embodiments. It should be noted that the following specific embodiments may exist independently, or be combined with each other. Regarding the same or similar content, it will not be repeated in different embodiments.

Figure 5:
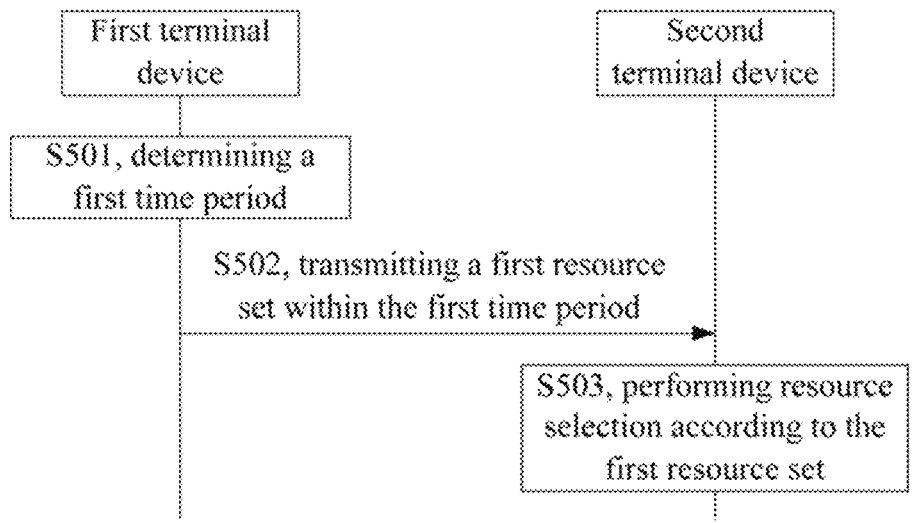
FIG. 5 is a schematic flowchart of a communication method according to an embodiment of the present disclosure.

FIG. 5 is a schematic flowchart of a communication method according to an embodiment of the present disclosure. With reference to FIG. 5, the method may include:

S501, a first terminal device determines a first time period.

The first time period is a time period within which the first terminal device transmits a first resource set to a second terminal device, such that the second terminal device can obtain the first resource set in time.

The first terminal device may determine the first time period according to first information. The first information includes at least one of the following information:
a request message received by the first terminal device from the second terminal device; or,
sensing information of the first terminal device; or,
a resource re-selection operation by the first terminal device.

When the first information is the request message, the first time period may be a time period within a first time length after the reception of the request message by the first terminal device. Namely, after the first terminal device receives the request message transmitted by the second terminal device, the first terminal device transmits the first resource set to the second terminal device within the first time length. The request message is used to request to acquire the first resource set; or, the request message is used to request to start or reset a timer, where a time length of the timer is the first time length.

When the first information is the sensing information, the first terminal device may determine, at a first time instant, whether a first condition is satisfied according to the sensing information. If the first condition is satisfied, a time period within a second time length after the first time instant is determined to be the first time period. Namely, if, at the first time instant, the first terminal device determines that the first condition is satisfied, according to the sensing information, the first terminal device transmits the first resource set to the second terminal device within a second preset time length. The first condition, which will be described in the following embodiments, will not be described here.

When the first information is the resource re-selection operation, the first time period is a time period within a third time length after the resource re-selection operation performed by the first terminal device. Namely, after the first terminal device finishes the resource re-selection operation, the first terminal device transmits the first resource set to the second terminal device within the third time length.

S502, the first terminal device transmits a first resource set to a second terminal device within the first time period.

The first terminal device may transmit the first resource set to the second terminal device through a sidelink.

In different cases, the contents included in the first resource set are different. For example, the first resource set may include a reserved resource of the first terminal device, and a resource in reserved resources of the second terminal device on which a resource conflict may occur in a future time period. The first resource set, which will be described in the following embodiments, will not be described here.

S503, the second terminal device performs resource selection according to the first resource set.

The second terminal device has a reserved resource. The second terminal device may perform resource selection according to the received first resource set and the reserved resource, and perform information transmission according to a selected resource.

In the embodiment as shown in FIG. 5, the first terminal device can determine the first time period, and transmit the first resource set to the second terminal device within the first time period, such that the second terminal device can receive the first resource set in time, and make reference to the first resource set when performing resource selection, thereby reducing the probability of a resource conflict between the second terminal device and another terminal device, and improving resource utilization.

The first terminal device may determine the first time period according to the first information. The process for the first terminal device to determine the first time period varies with the first information, and the first resource set transmitted by the first terminal device to the second terminal device may also vary therewith, which will be described through the embodiments as shown in FIG. 6-FIG. 13.

Figure 6:
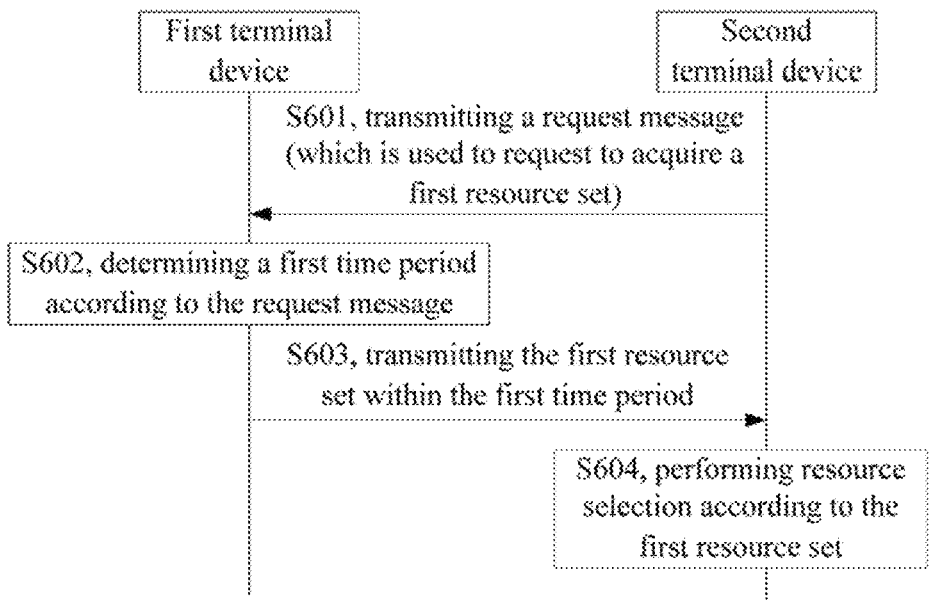
FIG. 6 is another schematic flowchart of a communication method according to an embodiment of the present disclosure.

FIG. 6 is another schematic flowchart of a communication method according to an embodiment of the present disclosure. With reference to FIG. 6, the method may include:

S601, a second terminal device transmits a request message to a first terminal device.

The request message is used to request to acquire a first resource set.

In an implementation, when the second terminal device needs to perform resource re-selection, the second terminal device transmits the request message to the first terminal device. For example, when a service cycle of the second terminal device changes or service processing of the second terminal device is completed, the second terminal device may transmit the request message to the first terminal device.

The request message is carried in a mode including at least one of the following: being carried through SCI, being carried through a medium access control control element (MAC CE); being carried through a sidelink radio resource control (RRC).

When the request message is carried through SCI, a value of a preset field of the SCI may be set to be a preset value to indicate transmission of the request message by the second terminal device to the first terminal device. In other words, the request message can be SCI, and the value of the preset field of the SCI is the preset value. Namely, if the first terminal device receives SCI, and the value of the preset field of the SCI is the preset value, the first terminal device determines that the request message is received. For example, the preset field may be a particular reserved bit, and the preset value may be 1. The SCI may be carried by a PSCCH (first-stage SCI) or carried by a PSSCH (second-stage SCI).

When the request message is carried through a MAC CE, the MAC CE contains a minimum time offset value and a maximum time offset value, and the minimum time offset value is different from the maximum time offset value. In other words, the request message can be a MAC CE, and the minimum time offset value and the maximum time offset value contained in the MAC CE are different. Namely, if the first terminal device receives a MAC CE which contains a minimum time offset value and a maximum time offset value, and the minimum time offset value and the maximum time offset value are different, the first terminal device determines that the request message is received. The MAC CE may be carried by a PSSCH.

A sidelink RRC message may be carried by a PSSCH.

S602, the first terminal device determines a first time period according to the request message.

The first time period may be a time period within a first time length after the reception of the request message by the first terminal device.

The first time period may be represented in the two modes as follows:

First mode: the first time period is [T_request+T_min, T_request+T_max].

T_request may be the time instant when the first terminal device receives the request message, or T_request may be an end point or start point of a time slot in which the time instant when the first terminal device receives the request message is located.

T_min and T_max may be in milliseconds, and T_min may have a value of zero.

In an implementation, values of T_min and T_max may be carried in the request message, or values of T_min and T_max may be configured by a network device, pre-configured, or defined in a standard.

Second mode: the first time period is [n_request+n_min, n_request+n_max].

n_request is the time slot in which the first terminal device receives the request message.

n_min and n_max may be numbers of physical time slots, or numbers of time slots in a transmitting resource pool where the second terminal device is in, or numbers of time slots in a transmitting resource pool where the first terminal device is in. n_min may have a value of zero. When the request message is carried through SCI, n_max may have a value of 2*T_R, where T_R represents a value of a resource reservation period field indicated in the SCI.

In an implementation, values of n_min and n_max may be carried in the request message, or values of n_min and n_max may be configured by a network device, pre-configured, or defined in a standard.

S603, the first terminal device transmits the first resource set to the second terminal device within the first time period.

In an implementation, the first resource set may include a reserved resource of the first terminal device; or, the first resource set may include a resource which is recommended by the first terminal device for the second terminal device to use; or, the first resource set may include a conflicting resource which is a same resource that is reserved by the second terminal device and another terminal device. By means of monitoring, the first terminal device can determine the resource recommended for the second terminal device to use or the conflicting resource. The conflicting resource may also be referred to as a colliding resource.

It should be noted that the first resource set may also be otherwise, as long as the first resource set can be used to assist the second terminal device in resource selection such that the probability of a resource conflict is reduced or the resource utilization is improved. S604, the second terminal device performs resource selection according to the first resource set.

If the second terminal device receives the first resource set at a second time instant, a start point of a resource selection window when the second terminal device performs resource selection may be not earlier than the second time instant, and the second time instant may be a start time or an end time of a time slot.

Figure 7:
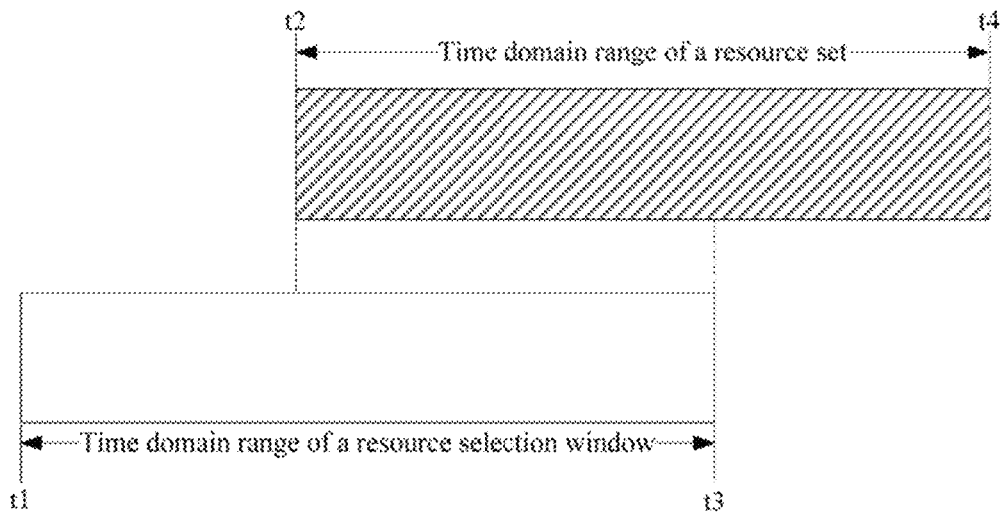
FIG. 7 is a schematic diagram for resource selection according to an embodiment of the present disclosure.

In an implementation, assuming that the first resource set includes a resource which is recommended by the first terminal device for the second terminal device to use, the second terminal device, when performing resource selection from reserved resources, may determine resources from the reserved resources (resource selection window) that overlap in time domain with the first resource set, and perform resource selection from the resources overlapping in time domain, which will be described in conjunction with FIG. 7 in the following.

FIG. 7 is a schematic diagram for resource selection according to an embodiment of the present disclosure. With reference to FIG. 7, the first resource set received by the second terminal device has a time domain range from t2 to t4, the resource selection window of the second terminal device has a time domain range from t1 to t3, then the overlapping resources of the resources in the first resource set and the resource selection window are resources between t2 and t3, and the second terminal device can perform resource selection from the resources between t2 and t3. Since the first resource set is determined by the first terminal device by means of monitoring, if the second terminal device uses a resource in the first resource set, the probability of a resource conflict with another terminal device is relatively low, and the resource utilization is relatively high.

In the embodiment as shown in FIG. 6, after the second terminal device transmits the request message to the first terminal device, the first terminal device can determine the first time period, and transmit the first resource set to the second terminal device within the first time period, such that the second terminal device can receive the first resource set in time, and make reference to the first resource set when performing resource selection, thereby reducing the probability of a resource conflict between the second terminal device and another terminal device, and improving the resource utilization.

Figure 8:
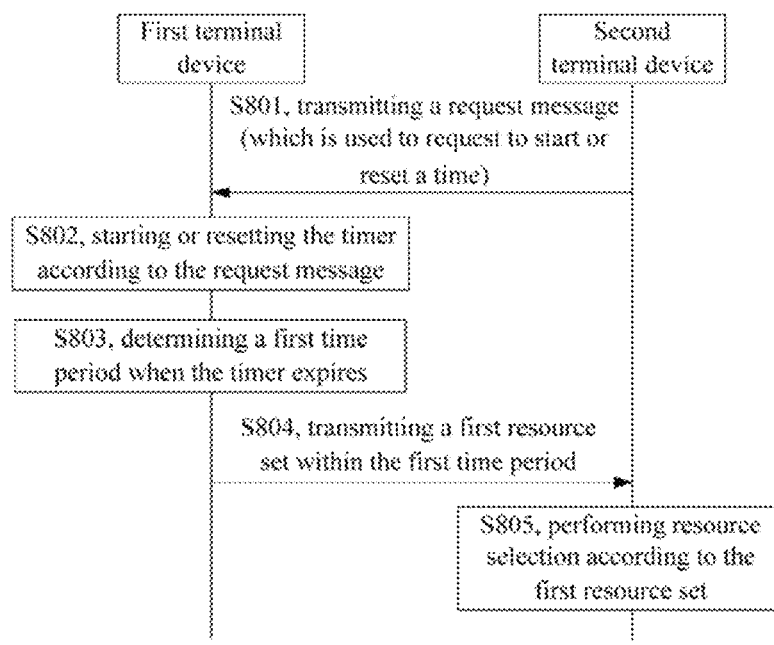
FIG. 8 is yet another schematic flowchart of a communication method according to an embodiment of the present disclosure.

FIG. 8 is yet another schematic flowchart of a communication method according to an embodiment of the present disclosure. With reference to FIG. 8, the method may include:

S801, a second terminal device transmits a request message to a first terminal device.

The request message is used to request to start or reset a timer, where a time length of the timer is the first time length.

The request message is carried in a mode including at least one of the following: being carried through SCI, being carried through a MAC CE; being carried through sidelink RRC.

When the request message is carried through SCI, a value of a preset field of the SCI may be set to be a preset value to indicate transmission of the request message by the second terminal device to the first terminal device. In other words, the request message can be SCI, and the value of the preset field of the SCI is the preset value. Namely, if the first terminal device receives SCI, and the value of the preset field of the SCI is the preset value, the first terminal device determines that the request message is received. For example, the preset field may be a particular reserved bit, and the preset value may be 1.

The SCI (second-stage SCI), the MAC CE or the sidelink RRC message may be carried by a PSSCH.

S802, the first terminal device starts or resets a timer according to the request message.

After the first terminal device starts or resets the timer, the timer starts timing.

S803, when the timer expires, the first terminal device determines a first time period.

The first time period may be a time period within a first time length after the expiration of the timer. The first time length may be included in the request message, or the first time length may be configured by a network device, pre-configured, or defined in a standard.

For example, if the timer expires at a time instant t0, the first time period may be [t0, t0+t1], where t1 is the first time length.

S804, the first terminal device transmits a first resource set to the second terminal device within the first time period.

S805, the second terminal device performs resource selection according to the first resource set.

It should be noted that, reference may be made to the execution process of S603-S604 for the execution process of S804-S805, which will not be repeated here.

In the embodiment as shown in FIG. 8, when the timer expires, the first terminal device can determine the first time period, and transmit the first resource set to the second terminal device within the first time period, such that the second terminal device can receive the first resource set in time, and make reference to the first resource set when performing resource selection, thereby reducing the probability of a resource conflict between the second terminal device and another terminal device, and improving the resource utilization.

Figure 9:
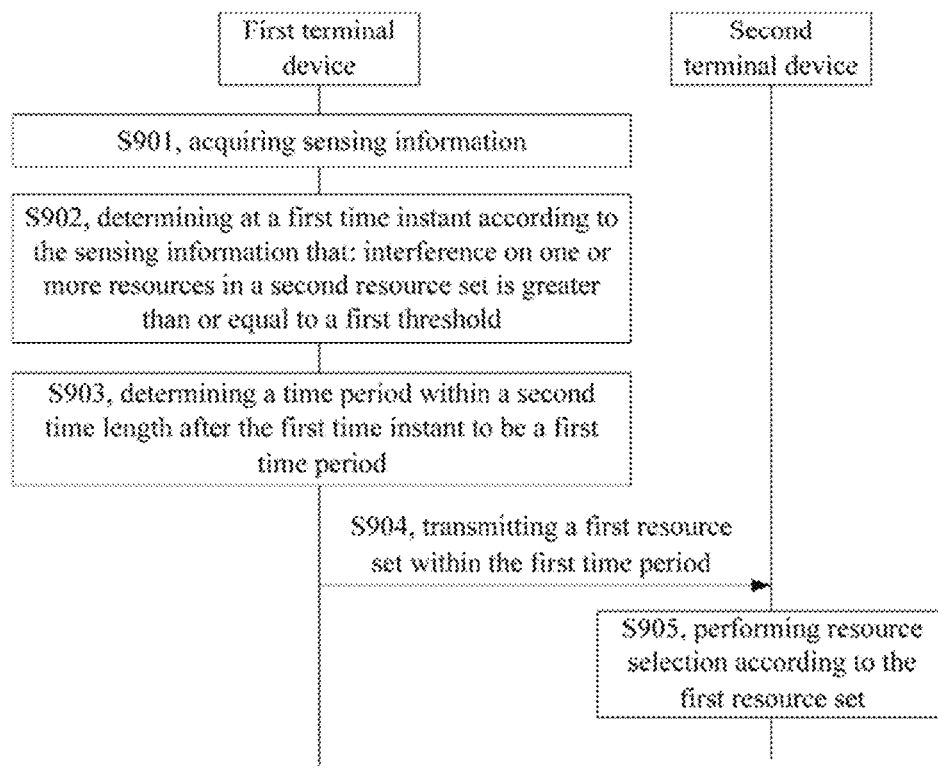
FIG. 9 is still another schematic flowchart of a communication method according to an embodiment of the present disclosure.

FIG. 9 is still another schematic flowchart of a communication method according to an embodiment of the present disclosure. With reference to FIG. 9, the method may include:

S901, a first terminal device acquires sensing information.

In an implementation, the sensing information may include sensing by the first terminal device for a PSCCH transmitted by another terminal device, and measurement by the first terminal device for reference information received power of another terminal device. The PSCCH can include a reserved resource of another terminal device therein.

S902, the first terminal device determines at a first time instant according to the sensing information, that a first condition is satisfied.

The first condition is that: interference on one or more resources in a second resource set is greater than or equal to a first threshold. The second resource set is a reserved resource of the second terminal device within a second time period, and the second time period is after the first time period.

The first time instant may be a time instant when it is determined that the first condition is satisfied, or the first time instant may be a start time or an end time of a time slot in which the time instant when it is determined that the first condition is satisfied is located.

The first terminal device may determine that the interference on one or more resources in the second resource set is greater than or equal to the first threshold through the following mode: the first terminal device may receive a PSCCH transmitted by another terminal device, and the PSCCH may include a reserved resource of another terminal device therein. When the first terminal device determines that a reserved resource of a fourth terminal device and a reserved resource of the second terminal device are overlapping, and when the first terminal device is able to measure a PSCCH-sidelink reference signal received power (RSRP) or a PSSCH-RSRP of the fourth terminal device, if the measured PSCCH-RSRP or PSSCH-RSRP is greater than or equal to the first threshold, it is determined that the interference on one or more resources in the second resource set is greater than or equal to the first threshold.

The first threshold is determined according to at least one of the following information:
  a capability of the first terminal device; or,
  a priority level for the second terminal device to transmit data and a priority level for a fourth terminal device to transmit data, where the fourth terminal device is a device which produces, within the second time period, interference on one or more resources in the second resource set.

The capability of the first terminal device may include: a capability of the first terminal device to demodulate a PSCCH and a capability of the first terminal device to demodulate a PSSCH. The capability of the first terminal device to demodulate a PSCCH may be indicated by demodualtion of a signal-to-noise ratio of the PSCCH by the first terminal device. The capability of the first terminal device to demodulate a PSSCH may be indicated by demodualtion of a signal-to-noise ratio of the PSSCH by the first terminal device. In an implementation, on any PSCCH resource, the first terminal device performs PSCCH decoding for three times according to the assumption of the three PSCCH DMRS mask sequences: $\{1, 1, 1\}$, $\{1, 1, e^{j2/3\pi}, e^{-j2/3\pi}\}$, $\{1, e^{-j2/3\pi}, e^{j2/3\pi}\}$.

If the priority level for the second terminal device to transmit data is higher than the priority level for the fourth terminal device to transmit data, and the fourth terminal device also has a function to perform resource selection according to the first resource set, the first threshold can be a positive infinity. If the priority level for the second terminal device to transmit data is lower than the priority level for the fourth terminal device to transmit data, and the fourth terminal device does not have the function to perform resource selection according to the first resource set, the first threshold can be determined according to the capability of the first terminal device.

S903, the first terminal device determines a time period within a second time length after the first time instant to be the first time period.

The second time length may be configured by the second terminal device, or configured by a network device, or pre-configured, or defined in a standard.

The second time length may also be a minimum value in a first value and a second value.

The first value is c-p-n, where c is a time domain location of a leading resource (the first resource) in the second resource set on which interference is greater than or equal to the first threshold, p is the shortest preparation time required by the second terminal device from the reception of the first resource set to responding to the first resource set, and n is the first time instant. Responding to the first resource set may be making a response according to the first resource set. For example, responding to the first resource set may be performing resource selection according to the first resource set.

The second value is a maximum delay allowed by the first terminal device from the first time instant to transmitting the first resource set. In an implementation, p and the second value may be configured by a network device, pre-configured, or defined in a standard.

The first time period will be described in conjunction with FIG. 10 in the following.

Figure 10:
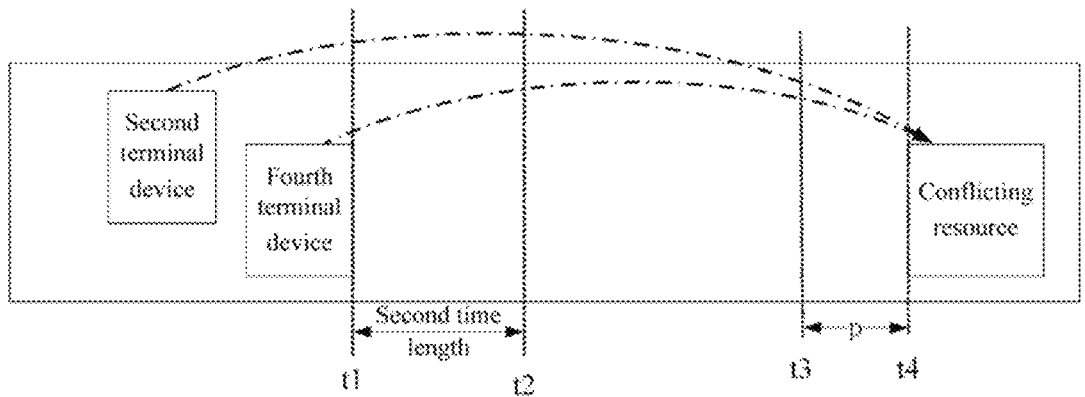
FIG. 10 is a schematic diagram of timing according to an embodiment of the present disclosure.

FIG. 10 is a schematic diagram of timing according to an embodiment of the present disclosure. With reference to FIG. 10, it is detected by the first terminal device at t1 (the unit thereof may be a time slot) that the fourth terminal device will cause relatively major interference to the second terminal device in a time period after t4 (the first condition is satisfied). Assuming that, in the second resource set of the second terminal device, a time domain location of a leading resource (the first resource) on which interference is greater than or equal to the first threshold is t4, if the shortest preparation time required by the second terminal device from the reception of the first resource set to responding to the first resource set is p, then the first resource set needs to be received by the second terminal device at the time instant t3 at the latest, otherwise it would be too late for the second terminal device to perform resource selection according to the first resource set even if the first resource set is received. If the first terminal device determines at the time instant t1 that the first condition is satisfied, the first terminal device needs to transmit the first resource set to the second terminal device within the second time length (from t1 to t2). It should be noted that if t2 is after t3, the first terminal device does not need to transmit a resource set to the second terminal device.

S904, the first terminal device transmits a first resource set to the second terminal device within the first time period.

In an implementation, the first resource set includes one or more resources in the second resource set on which interference is greater than or equal to the first threshold. Namely, the first resource set includes a conflicting resource in the second resource set.

S905, the second terminal device performs resource selection according to the first resource set.

In an implementation, when performing resource selection, the second terminal device may exclude, from the second resource set, a resource which is in the first resource set, and then perform resource selection. In this way, the second terminal device can be prevented from selecting a conflicting resource.

In the embodiment as shown in FIG. 9, when it is detected by the first terminal device that the interference on one or more resources in the second resource set of the second terminal device is greater than or equal to the first threshold, the first terminal device can determine the first time period, and transmit the first resource set to the second terminal device within the first time period, such that the second terminal device can receive the first resource set in time, and make reference to the first resource set when performing resource selection, thereby reducing the probability of a resource conflict between the second terminal device and another terminal device, and improving the resource utilization.

Figure 11:
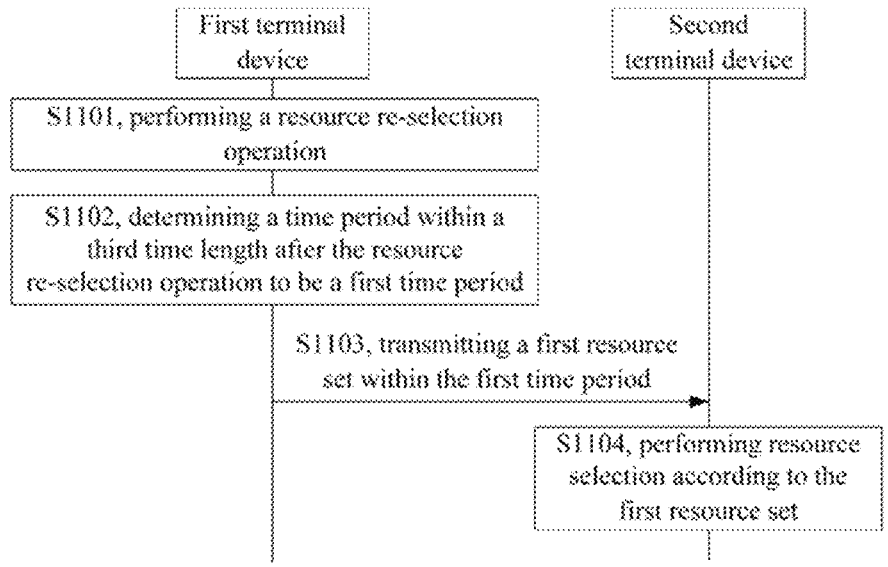
FIG. 11 is another schematic flowchart of a communication method according to an embodiment of the present disclosure.

FIG. 11 is another schematic flowchart of a communication method according to an embodiment of the present disclosure. With reference to FIG. 11, the method may include: S1101, a first terminal device performs a resource re-selection operation.

The resource re-selection operation means that the first terminal device updates its reserved resource.

S1102, the first terminal device determines a time period within a third time length after the resource re-selection operation to be a first time period.

In an implementation, the first terminal device can determine the first time period only when it is determined that the fourth condition is satisfied.

The fourth condition includes at least one of the following conditions.

Condition 1, there is an overlapping resource between a reserved resource of the first terminal device after the resource re-selection operation and a reserved resource of a second terminal device.

In condition 1, after the first terminal device performs the resource re-selection operation, a resource conflict may occur between the first terminal device and the second terminal device in a future time period.

Condition 2, a time difference between the overlapping resource and a current time instant is greater than or equal to a fourth threshold.

If the time difference between the overlapping resource and the current time instant is less than the fourth threshold, it means that the first terminal device cannot avoid a resource conflict by transmitting a first resource set to the second terminal device. Namely, only when the first terminal device has sufficient time to transmit the first resource set to the second terminal device and the second terminal device has sufficient time to make a response according to the first resource set (perform resource selection according to the first resource set), the first terminal device would determine the first time period and transmit the first resource set to the second terminal device in the first time period.

Condition 3, a priority level for the first terminal device to transmit data is higher than a priority level for the second terminal device to transmit data.

Condition 4, the priority level for the first terminal device to transmit data is greater than or equal to a fifth threshold.

Condition 5, at least one of resources selected by the first terminal device after resource selection or a resource re-selection operation is located in an active time of discontinuous reception (DRX), the DRX is configured for the first terminal device for a unicast link between the first terminal device and the second terminal device.

The DRX includes an active time and an inactive time. If the first terminal device is configured with the DRX for the unicast link between the first terminal device and the second terminal device, the first terminal device receives a PSCCH or a PSSCH from the second terminal device in the active time of the DRX, and the first terminal device does not receive the PSCCH or PSSCH from the second terminal device in other time.

S1103, the first terminal device transmits a first resource set to the second terminal device within the first time period.

In an implementation, the first resource set may include a resource of the first terminal device after a resource re-selection.

In an implementation, the first resource set includes a conflicting resource, which is an overlapping resource between a reserved resource of the first terminal device (the reserved resource after the resource re-selection) and a reserved resource of the second terminal device.

The first terminal device, when transmitting the first resource set to the second terminal device, may also transmit, to the second terminal device, indication information for indicating a type of a resource included in the first resource set. The type of a resource may be: a reserved resource of the first terminal device, a conflicting resource, etc.

S1104, the second terminal device performs resource selection according to the first resource set.

In an implementation, if the first resource set includes a resource of the first terminal device after resource re-selection, the second terminal device, when performing resource selection, can determine a conflicting resource according to the first resource set and the second resource set (reserved resources of the second terminal device), exclude a resource which is in the first resource set from the second resource set, and then perform resource selection. In this way, the second terminal device can be prevented from selecting a conflicting resource.

In an implementation, if the first resource set includes a conflicting resource, the second terminal device may exclude, from the second resource set (reserved resources of the second terminal device), a resource which is in the first resource set, and then perform resource selection. In this way, the second terminal device can be prevented from selecting a conflicting resource The first terminal device may transmit the first resource set to the second terminal device on a first time domain resource, where the first time domain resource is the first resource in reserved resources of the first terminal device after the resource re-selection operation.

In the embodiment as shown in FIG. 11, after the first terminal device performs a resource re-selection operation, the first terminal device can determine the first time period, and transmit the first resource set to the second terminal device within the first time period, such that the second terminal device can receive the first resource set in time, and make reference to the first resource set when performing resource selection, thereby reducing the probability of a resource conflict between the second terminal device and another terminal device, and improving the resource utilization.

Figure 12:
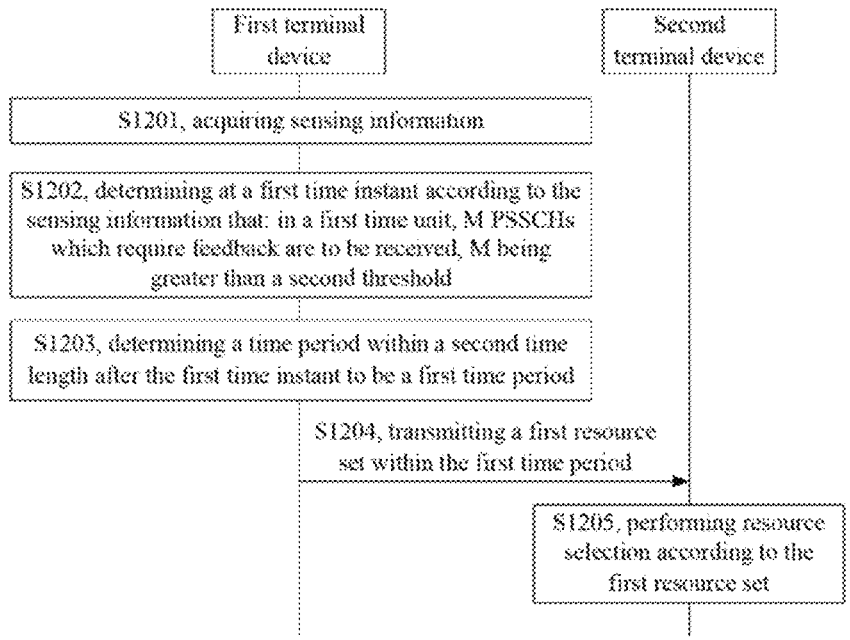
FIG. 12 is yet another schematic flowchart of a communication method according to an embodiment of the present disclosure.

FIG. 12 is yet another schematic flowchart of a communication method according to an embodiment of the present disclosure. With reference to FIG. 12, the method may include:

S1201, a first terminal device acquires sensing information.

The first terminal device can receive a PSCCH transmitted by another terminal device, and determine according to the PSCCH which terminal device will transmit a PSSCH to the first terminal device in a future time unit.

S1202, the first terminal device determines at a first time instant according to the sensing information that a first condition is satisfied.

The first condition is: the first terminal device is about to receive, in a first time unit, M PSSCHs which require HARQ feedback, where M is an integer greater than a second threshold, the first time unit is a time unit after a current time instant, and a PSSCH from the second terminal device exists in the M PSSCHs.

A PSSCH that requires HARQ feedback refers to a PSSCH that requires transmission of a response message. Namely, after the first terminal device receives a PSSCH transmitted by the second terminal device which requires HARQ feedback, the first terminal device needs to transmit a response message corresponding to the PSSCH to the second terminal device. For example, the response message can be a HARQ-ACK.

If the first terminal device receives, in the first time unit, M PSSCHs that require HARQ feedback, the first terminal device needs to transmit M response messages in another time unit after the first time unit. In an implementation, the second threshold is a maximum data processing amount of the first terminal device in one time unit.

S1203, the first terminal device determines a time period within a second time length after the first time instant to be a first time period.

The second time length may be configured by the second terminal device, or configured by a network device, or pre-configured, or defined in a standard.

In an implementation, when the first terminal device determines that a second condition is satisfied, the first terminal device determines the time period within the second time length after the first time instant to be the first time period.

In an implementation, the second condition includes at least one of the following conditions.

Condition 1: a time difference between the first time unit and a current time unit is greater than or equal to a third threshold.

If the time difference between the first time unit and the current time unit is less than the third threshold, it means that the first terminal device cannot avoid a resource conflict by transmitting a first resource set to the second terminal device. Namely, upon arrival of the first time unit, only when the first terminal device has sufficient time to transmit the first resource set to the second terminal device, and the second terminal device has sufficient time to make a response according to the first resource set (perform resource selection according to the first resource set), the first terminal device would determine the first time period and transmit the first resource set to the second terminal device within the first time period.

Condition 2: a priority level for the second terminal device to transmit data is lower than a priority level for a fifth terminal device to transmit data, and the M PSSCHs are at least from the second terminal device and the fifth terminal device.

The first terminal device is about to receive M PSSCHs from M terminal devices in the first time unit. The fifth terminal device may be any terminal device other than the second terminal device in the M terminal devices. Namely, in the M terminal devices, the second terminal device has a lowest priority level.

Condition 3: the second terminal device has a function to perform resource selection according to the first resource set, and the fifth terminal device does not have the function to perform resource selection according to the first resource set.

Condition 4: between the second terminal device and the fifth terminal device, the second terminal device has a lowest priority level to transmit data in the first time unit.

S1204, the first terminal device transmits a first resource set to the second terminal device within the first time period.

In an implementation, the first resource set includes a resource reserved by the second terminal device in the first time unit.

S1205, the second terminal device performs resource selection according to the first resource set.

In an implementation, the second terminal device can exclude, from the second resource set (reserved resources of the second terminal device), a resource which is in the first resource set, and then perform resource selection. In this way, the second terminal device can be prevented from transmitting, in the first time unit, a PSSCH that requires HARQ feedback to the first terminal device, thereby preventing the first terminal device from receiving in the first time unit too many PSSCHs that require HARQ feedback.

In the embodiment as shown in FIG. 12, when the first terminal device determines that it needs to receive, in a future first time unit, M PSSCHs that require HARQ feedback, the first terminal device can determine the first time period, and transmit the first resource set to the second terminal device within the first time period, such that the second terminal device can receive the first resource set in time, and is prevented transmitting to the first terminal device in the first time unit a PSSCH that requires HARQ feedback, thereby, the first terminal device can be prevented from receiving in the first time unit too many PSSCHs that require HARQ feedback, and further the first terminal device is prevented from overloading.

Figure 13:
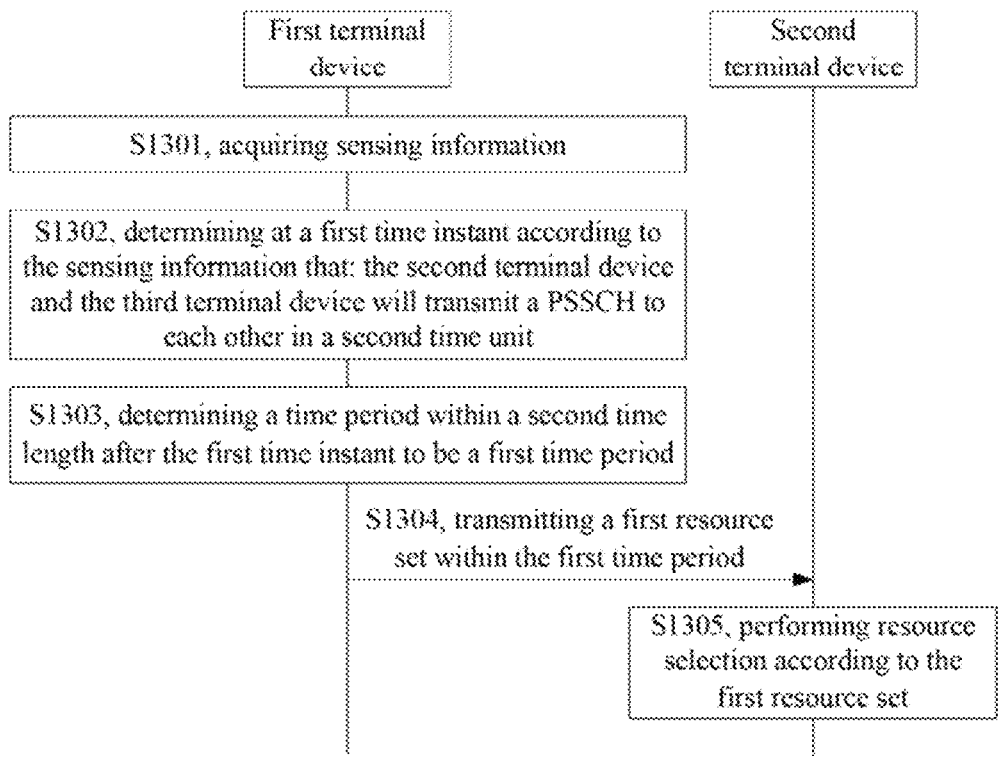
FIG. 13 is another schematic flowchart of a communication method according to an embodiment of the present disclosure.

FIG. 13 is another schematic flowchart of a communication method according to an embodiment of the present disclosure. With reference to FIG. 13, the method may include: S1301, a first terminal device acquires sensing information.

The first terminal device can determine the transmission of a PSSCH by another terminal device in a future time unit according to sensing of a PSCCH for another terminal device. For example, the first terminal device can determine, according to a PSCCH for another terminal device, in which future time unit and to which terminal device another terminal device will transmit a PSSCH.

S1302, the first terminal device determines at a first time instant that a first condition is satisfied, according to the sensing information.

The first condition is: in a second time unit, the second terminal device needs to transmit a PSSCH to a third terminal device and the third terminal device needs to transmit a PSSCH to the second terminal device as well, where the second time unit is a time unit after a current time instant. Namely, in the coming second time unit, the second terminal device and the third terminal device will transmit a PSSCH to each other. Due to limitation of half duplex, a terminal device cannot receive data while transmitting data. Therefore, if both the second terminal device and the third terminal device transmit data in the second time unit, the second terminal device and the third terminal device may fail to receive data.

The first terminal device may determine that the first condition is satisfied through the following mode: the 8-bit LSB (least significant bit) of a target ID indicated in a PSSCH transmitted by the third terminal device is the same as a source ID indicated in a PSSCH transmitted by the second terminal device. In addition, the 8-bit LSB (least significant bit) of a target ID indicated in a PSSCH transmitted by the second terminal device is the same as a source ID indicated in a PSSCH transmitted by the third terminal device.

S1303, the first terminal device determines a time period within a second time length after the first time instant to be a first time period.

In an implementation, the first terminal device can determine the time period within the second time length after the first time instant to be the first time period, when it is determined that the third condition is satisfied.

The third condition includes at least one of the following conditions:
a priority level for the second terminal device to transmit data is lower than a priority level for the third terminal device to transmit data; or
the second terminal device has a function to perform resource selection according to the first resource set.

S1304, the first terminal device transmits a first resource set to the second terminal device within the first time period.

In an implementation, the first resource set includes a resource reserved by the second terminal device in the second time unit.

S1305, the second terminal device performs resource selection according to the first resource set.

In an implementation, when performing resource selection, the second terminal device may exclude, from the second resource set, a resource which is in the first resource set, and then perform resource selection. In this way, the second terminal device can be prevented from transmitting a PSSCH to the third terminal device in the second time unit, thereby, data reception failures of the second terminal device and the third terminal device can be avoided.

In the embodiment as shown in FIG. 13, upon detection that the second terminal device and the third terminal device will transmit data to each other in a future second time unit, the first terminal device can determine the first time period, and transmit the first resource set to the second terminal device within the first time period, such that the second terminal device, after receiving the first resource set, is prevented from transmitting a PSSCH to the third terminal device in the second time unit, thereby, reception failures of the second terminal device and the third terminal device are avoided, and a success rate of data transmission is improved.

Figure 14:
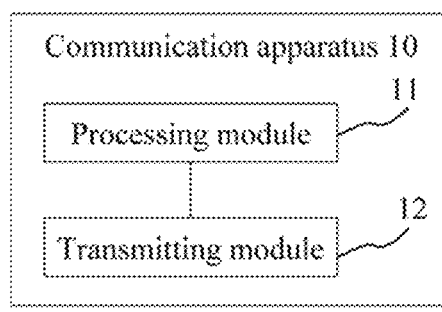
FIG. 14 is a schematic structural diagram of a communication apparatus according to an embodiment of the present disclosure.

FIG. 14 is a schematic structural diagram of a communication apparatus according to an embodiment of the present disclosure. With reference to FIG. 14, the communication apparatus 10 may include a processing module 11 and a transmitting module 12, where:
the processing module 11 is configured to determine a first time period;
the transmitting module 12 is configured to transmit a first resource set to a second terminal device within the first time period, where the first resource set is used for the second terminal device to perform resource selection.

The communication apparatus according to the embodiments of the present disclosure can implement the technical solution as shown in the foregoing method embodiments; and its implementation principle and beneficial effects are similar thereto, which will not be repeated here.

In a possible implementation, the processing module 11 is specifically configured to determine the first time period according to first information, where the first information includes at least one of the following information:
a request message received by a first terminal device from the second terminal device; or,
sensing information of the first terminal device; or,
a resource re-selection operation by the first terminal device.

In a possible implementation, where the first information is the request message,
and
the first time period is a time period within a first time length after the reception of the request message by the first terminal device.

In a possible implementation, the request message is carried in a mode including at least one of the following:
being carried through sidelink control information SCI;
being carried through a medium access layer control element MAC CE; or
being carried through sidelink radio resource control RRC.

In a possible implementation, a value of a preset field of the SCI is a preset value.

In a possible implementation, the MAC CE contains a minimum time offset value and a maximum time offset value, the minimum time offset value is different from the maximum time offset value, and the minimum time offset value and the maximum time offset value are used for the first terminal device to determine the first time period.

In a possible implementation,
the request message is used to request to acquire the first resource set; or,
the request message is used to request to start or reset a timer, where a time length of the timer is the first time length.

In a possible implementation, the first information is the sensing information, and the processing module 11 is specifically configured to:
determine at a first time instant that a first condition is satisfied, according to the sensing information; and
determine a time period within a second time length after the first time instant to be the first time period.

In a possible implementation, the first condition includes at least one of the following conditions:
within a second time period, interference on one or more resources in a second resource set is greater than or equal to a first threshold, where the second resource set is a reserved resource of the second terminal device within the second time period, and the second time period is after the first time period; or,
the first terminal device is about to receive, in a first time unit, M PSSCHs which require HARQ feedback, where M is an integer greater than a second threshold, the first time unit is a time unit after a current time instant, and a PSSCH from the second terminal device exists in the M PSSCHs; or,
in a second time unit, the second terminal device is about to transmit a PSSCH to a third terminal device and the third terminal device is about to transmit a PSSCH to the second terminal device, where the second time unit is a time unit after the current time instant.

In a possible implementation, the first condition is that, within a second time period, interference on one or more resources in a second resource set is greater than or equal to a first threshold; and
the first resource set includes one or more resources in the second resource set on which interference is greater than or equal to the first threshold.

In a possible implementation, the first threshold is determined according to at least one of the following information:
a capability of the first terminal device; or,
a priority level for the second terminal device to transmit data and a priority level for a fourth terminal device to transmit data, where the fourth terminal device is a device which produces, within the second time period, interference on one or more resources in the second resource set.

In a possible implementation, the second time length is a minimum value in a first value and a second value;
the first value is c-p-n, where c is a time domain location of a leading resource (the first resource) in the second resource set on which interference is greater than or equal to the first threshold, p is the shortest preparation time required by the second terminal device from the reception of the first resource set to responding to the first resource set, and n is the first time instant; and
the second value is a maximum delay allowed by the first terminal device from the first time instant to transmitting the first resource set.

In a possible implementation, the first condition is that the first terminal device needs to receive, in a first time unit, M sidelink data channels PSSCHs which require HARQ feedback;
the first resource set includes a resource reserved by the second terminal device in the first time unit.

In a possible implementation, the processing module 11 is specifically configured to:
when it is determined that a second condition is satisfied, determine the time period within the second time length after the first time instant to be the first time period.

In a possible implementation, the second condition includes at least one of the following conditions:
a time difference between the first time unit and a current time unit is greater than or equal to a third threshold; or,
a priority level for the second terminal device to transmit data is lower than a priority level for a fifth terminal device to transmit data, and the M PSSCHs are at least from the second terminal device and the fifth terminal device; or, the second terminal device has a function to perform resource selection according to the first resource set, and the fifth terminal device does not have the function to perform resource selection according to the first resource set; or, between the second terminal device and the fifth terminal device, the second terminal device has a lowest priority level to transmit data in the first time unit.

In a possible implementation, the first condition is that, in a second time unit, the second terminal device has data to transmit to a third terminal device, and the third terminal device has data to transmit to the second terminal device; and the first resource set includes a resource reserved by the second terminal device in the second time unit.

In a possible implementation, the processing module 11 is specifically configured to:

when it is determined that a third condition is satisfied, determine the time period within the second time length after the first time instant to be the first time period.

In a possible implementation, the third condition includes at least one of the following conditions:

a priority level for the second terminal device to transmit data is lower than a priority level for the third terminal device to transmit data; or the second terminal device has a function to perform resource selection according to the first resource set.

In a possible implementation, the first information is the resource re-selection operation; and the first time period is a time period within a third time length after the resource re-selection operation performed by the first terminal device.

In a possible implementation, the transmitting module 12 is specifically configured to:

when it is determined that a fourth condition is satisfied, transmit the first resource set to the second terminal device within the first time period.

In a possible implementation, the fourth condition includes at least one of the following conditions:

there is an overlapping resource between a reserved resource of the first terminal device after the resource re-selection operation and a reserved resource of the second terminal device; or, a time difference between the overlapping resource and a current time instant is greater than or equal to a fourth threshold; or, a priority level for the first terminal device to transmit data is higher than a priority level for the second terminal device to transmit data; or the priority level for the first terminal device to transmit data is greater than or equal to a fifth threshold; or, at least one of resources selected by the first terminal device after resource selection or a resource re-selection operation is located in an active time of discontinuous reception DRX, the DRX is configured for the first terminal device for a unicast link between the first terminal device and the second terminal device.

In a possible implementation, the transmitting module 12 is specifically configured to:

transmit the first resource set to the second terminal device on a first time domain resource, where the first time domain resource is a leading resource (the first resource) in a reserved resource of the first terminal device after the resource re-selection operation.

The communication apparatus according to the embodiments of the present disclosure can implement the technical solution as shown in the foregoing method embodiments; and its implementation principle and beneficial effects are similar thereto, which will not be repeated here.

Figure 15:
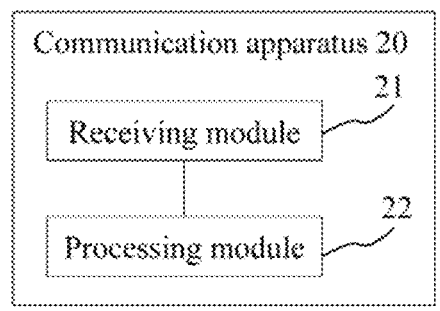
FIG. 15 is another schematic structural diagram of a communication apparatus according to an embodiment of the present disclosure.

FIG. 15 is another schematic structural diagram of a communication apparatus according to an embodiment of the present disclosure. With reference to FIG. 15, the communication apparatus 20 may include a receiving module 21 and a processing module 22, where:

the receiving module 21 is configured to receive within a first time period a first resource set from a first terminal device;

the processing module 22 is configured to perform resource selection according to the first resource set.

The communication apparatus according to the embodiment of the present disclosure can implement the technical solution as shown in the foregoing method embodiments; and its implementation principle and beneficial effects are similar thereto, which will not be repeated here.

In a possible implementation, the first time period is determined by the first terminal device according to first information, and the first information includes at least one of the following information:

a request message received by the first terminal device from the second terminal device; or, sensing information of the first terminal device; or, a resource re-selection operation by the first terminal device.

The communication apparatus according to the embodiment of the present disclosure can implement the technical solution as shown in the foregoing method embodiments; and its implementation principle and beneficial effects are similar thereto, which will not be repeated here.

Figure 16:
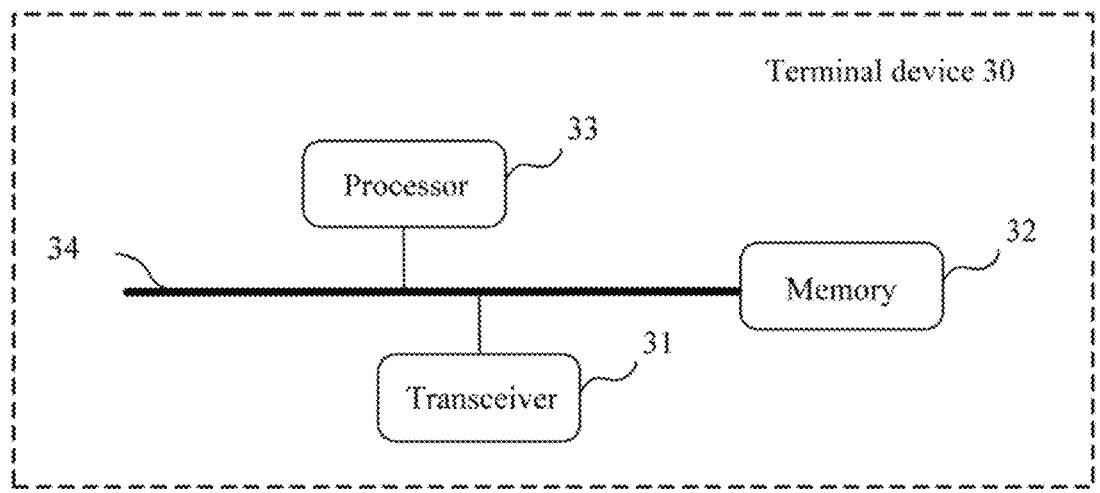
FIG. 16 is a schematic structural diagram of a terminal device according to an embodiment of the present disclosure.

FIG. 16 is a schematic structural diagram of a terminal device according to an embodiment of the present disclosure. With reference to FIG. 16, the terminal device 30 may include: a transceiver 31, a memory 32, and a processor 33. The transceiver 31 may include: a transmitter and/or a receiver. The transmitter may also be referred to as a sender, a source, a transmission port, a transmitting interface or other similar descriptions. The receiver may also be referred to as a receptor, a sink, a reception port, a receiving interface or other similar descriptions. By way of example, the transceiver 31, the memory 32 and the processor 33 are connected with each other through a bus 34.

The memory 32 is configured to store program instructions; and the processor 33 is configured to execute the program instructions stored in the memory to enable the terminal device 30 to implement any one of the communication methods described above.

The transceiver 31 can be configured to implement the reception function and transmission function of the terminal device in the communication methods described above.

An embodiment of the present disclosure provides a computer-readable storage medium storing thereon computer-executable instructions, where a communication method described above is implemented when the computer-executable instructions are executed by a processor.

An embodiment of the present disclosure further provides a computer program product which can be executed by a processor. When the computer program product is executed, a communication method implemented by any terminal device as described above is implemented.

The terminal device, computer-readable storage medium and computer program product according to the embodiments of the present disclosure can implement a communication method implemented by the terminal device described above. Reference is made to the foregoing description for the specific implementation process and beneficial effects, which will not be repeated here.

The network device, computer-readable storage medium and computer program product according to the embodiments of the present disclosure can implement a communication method implemented by the network device described above. Reference is made to the foregoing description for the specific implementation process and beneficial effects, which will not be repeated here.

All or part of the steps for implementing the various method embodiments described above may be implemented through hardware related to program instructions. The mentioned program may be stored in a readable memory. When the program is executed, the steps including that of the various method embodiments described above are executed. The mentioned memory (storage medium) includes: a read-only memory (ROM), a RAM, a flash memory, a hard disk, a solid state disk, a magnetic tape, a floppy disk, an optical disc, or any combination thereof.

The embodiments of the present disclosure are described with reference to the flow charts and/or the block diagrams of the method, device (system), and computer program product according to the embodiments of the present disclosure. It should be understood that each process and/or block in a flow chart and/or block diagram, and a combination of processes and/or blocks in the flow chart and/or block diagram can be implemented with computer program instructions. These computer program instructions may be provided to a processing unit of a general purpose computer, a special purpose computer, an embedded processor or other programmable data processing device to generate a machine, such that instructions executed by a processing unit of a computer or other programmable data processing device generate an apparatus for implementing functions specified in one or more processes in a flow chart and/or one or more blocks in a block diagram.

These computer program instructions may also be stored in a computer-readable memory that can boot up a computer or other programmable data processing device to work in a specific way, so that the instructions stored in the computer-readable memory generate a manufacture containing an instruction device that implements the functions specified in one or more processes in a flow chart and/or one or more blocks in a block diagram.

These computer program instructions may also be loaded into a computer or other programmable data processing device to cause a series of operating steps to be executed on the computer or other programmable device to generate a computer implemented process, so that the instructions executed on the computer or other programmable device provide steps for implementing functions specified in one or more processes in a flow chart and/or one or more blocks in a block diagram.

Obviously, those skilled in the art can make various changes and modifications to the embodiments of the present disclosure without departing from the spirit and scope of the present disclosure. Therefore, if these changes and modifications to the embodiments of the present disclosure fall within the scope of the claims of the present disclosure and their technical equivalence, the present disclosure is also intended to include these changes and modifications.

In the present disclosure, the term "including" and its variants may mean non-exclusive including. The term "or" and its variants may mean "and/or". In the present disclosure, the terms "first", "second" or the like are used to distinguish similar objects, but not necessarily to describe a specific order or sequence. In the present disclosure, "multiple" means two or more; "and/or" describes the relationship between related objects, which indicates that there may be three kinds of relationships, for example, A and/or B may indicate three situations where A exists alone, both A and B exist, and B exists alone. The character "/" generally indicates that contextually related objects are in an "or" relationship.

What is claimed is:

1. A communication method, comprising:
   determining, by a first terminal device, a first time period; and
   transmitting within the first time period, by the first terminal device, a first resource set to a second terminal device, wherein the first resource set is used for the second terminal device to perform resource selection;
   wherein determining, by the first terminal device, the first time period comprises:
      determining, by the first terminal device, the first time period according to first information, wherein the first information comprises sensing information of the first terminal device;
   wherein determining, by the first terminal device, the first time period comprises:
      determining, by the first terminal device, a time period within a second time length immediately after a first time instant to be the first time period, wherein the first time instant is a time instant when it is determined that the first condition is satisfied,
   wherein the first condition comprises:
      within a second time period, interference on one or more resources in a second resource set is greater than or equal to a first threshold, wherein the second resource set comprises a reserved resource of the second terminal device within the second time period, and the second time period is after the first time period.

2. The method according to claim 1, wherein
   the first condition is that, within a second time period, interference on one or more resources in a second resource set is greater than or equal to a first threshold; and
   the first resource set comprises one or more resources in the second resource set on which interference is greater than or equal to the first threshold.

3. The method according to claim 2, wherein the first threshold is determined according to at least one of the following information:
   a priority level for the second terminal device to transmit data and a priority level for a third terminal device to transmit data, wherein the third terminal device is a device which produces, within the second time period, interference on one or more resources in the second resource set.

4. A terminal device, comprising a transceiver, a processor and a memory;
   wherein the memory has computer-executable instructions stored therein, and the processor executes the computer-executable instructions stored in the memory, to enable the processor to implement the steps of:
   determining a first time period; and
   transmitting within the first time period, a first resource set to a second terminal device, wherein the first resource set is used for the second terminal device to perform resource selection;

wherein determining the first time period comprises:
  determining the first time period according to first information, wherein the first information comprises sensing information of the terminal device,
wherein the processor executes the computer-executable instructions stored in the memory to enable the processor to implement a step of:
  determining a time period within a second time length immediately after a first time instant to be the first time period, wherein the first time instant is a time instant when it is determined that the first condition is satisfied,
wherein the first condition comprises:
  within a second time period interference on one or more resources in a second resource set is greater than or equal to a first threshold, wherein the second resource set comprises a reserved resource of the second terminal device within the second time period, and the second time period is after the first time period.

5. The terminal device according to claim 4, wherein
the first condition is that, within a second time period, interference on one or more resources in a second resource set is greater than or equal to a first threshold; and
the first resource set comprises one or more resources in the second resource set on which interference is greater than or equal to the first threshold.

6. The terminal device according to claim 5, wherein the first threshold is determined according to at least one of the following information:
  a priority level for the second terminal device to transmit data and a priority level for a third terminal device to transmit data, wherein the third terminal device is a device which produces, within the second time period, interference on one or more resources in the second resource set.

7. A non-transitory computer-readable storage medium, storing thereon computer-executable instructions, when being executed by a processor of a first terminal device, implement the steps of:
  determining a first time period; and
  transmitting within the first time period, a first resource set to a second terminal device, wherein the first resource set is used for the second terminal device to perform resource selection;
wherein determining the first time period comprises:
  determining the first time period according to first information, wherein the first information comprises sensing information of the first terminal device,
wherein determining the first time period comprises:
  determining a time period within a second time length immediately after a first time instant to be the first time period, wherein, the first time instant is a time instant when it is determined that the first condition is satisfied,
wherein the first condition comprises:
  within a second time period, interference on one or more resources in a second resource set is greater than or equal to a first threshold, wherein the second resource set comprises a reserved resource of the second terminal device within the second time period, and the second time period is after the first time period.

8. The non-transitory computer-readable storage medium according to claim 7, wherein
the first condition is that, within a second time period, interference on one or more resources in a second resource set is greater than or equal to a first threshold; and
the first resource set comprises one or more resources in the second resource set on which interference is greater than or equal to the first threshold.

9. The non-transitory computer-readable storage medium according to claim 8, wherein the first threshold is determined according to at least one of the following information:
  a priority level for the second terminal device to transmit data and a priority level for a third terminal device to transmit data, wherein the third terminal device is a device which produces, within the second time period, interference on one or more resources in the second resource set.

* * * * *